_US005696235A_

United States Patent [19]

Oka et al.

[11] Patent Number: 5,696,235
[45] Date of Patent: Dec. 9, 1997

[54] POLYIMIDE AMD PROCESS FOR PRODUCING THE SAME

[75] Inventors: Osamu Oka; Takeshi Hashimoto; Takeshi Nishigaya, all of Shizuoka, Japan

[73] Assignee: Tomoegawa Paper Co., Ltd., Tokyo, Japan

[21] Appl. No.: 649,565

[22] Filed: May 17, 1996

[30] Foreign Application Priority Data

May 31, 1995 [JP] Japan ................................. 7-155473
Sep. 14, 1995 [JP] Japan ................................. 7-261029

[51] Int. Cl.$^6$ ............................ C08G 73/10; C08G 69/26
[52] U.S. Cl. ......................... 528/353; 528/125; 528/128; 528/170; 528/171; 528/172; 528/173; 528/176; 528/183; 528/185; 528/188; 528/220; 528/229; 528/310; 528/322; 528/350
[58] Field of Search .......................... 528/171, 176, 528/170, 172, 310, 173, 322, 35, 350, 220, 229, 125, 128, 183, 185, 188

[56] References Cited

U.S. PATENT DOCUMENTS

| | | | |
|---|---|---|---|
| 3,741,942 | 6/1973 | Crivello | 528/321 |
| 5,093,459 | 3/1992 | Peter et al. | 528/321 |
| 5,106,937 | 4/1992 | Yamaya et al. | 528/125 |
| 5,194,567 | 3/1993 | Lewis | 528/170 |
| 5,457,154 | 10/1995 | Ohta et al. | 528/353 |

OTHER PUBLICATIONS

Organic Synthetic Chemistry, vol.43, No. 10 by Yoshio Imai pp. 932–940, (with its excerpt Japanese translation, Synthesis of Condensation Polymers by Michael–Tyoe addition Reaction.)(2-12-1).

_Primary Examiner_—James J. Seidleck
_Assistant Examiner_—P. Hampton-Hightower
_Attorney, Agent, or Firm_—Lowe, Price, LeBlanc & Becker

[57] ABSTRACT

Novel polyimides which are soluble in various organic solvents and excellent in thermal resistance, processability are disclosed. The polyimides comprise repeating units represented by the following formula (1) and/or (2) and having a number average molecular weight of 4,000–200,000.

[Structure (1): N—Ar—N linked imide with $X^1$—Ra—$X^1$—]

[Structure (4): N—Ar—N linked imide with $X^2$—Rb—$X^2$—]

wherein Ar is a divalent group represented by the following formula (2) or (3):

[Structure (2): phenyl—O—phenyl—Y—phenyl—O—phenyl]

wherein Y is —O—, —CO—, —S—, —SO$_2$— or —C(CH$_3$)$_2$—,

[Structure (3): substituted biphenylmethane with $R^1$, $R^2$, $R^3$, $R^4$]

wherein $R^1$, $R^2$, $R^3$ and $R^4$ are each a $C_{1-4}$ alkyl group or a $C_{1-4}$ alkoxy group, Ra is a divalent group having 2–6 benzene rings, $X^1$ represents NH, NR (wherein R is a $C_{1-4}$ alkyl group or a $C_{1-4}$ alkoxy group) or S, Rb is $C_{2-20}$ alkylene group, ether group or dimethylsiloxane group, and $X_2$ represents NH, NR (wherein R is a $C_{1-4}$ alkyl group or a $C_{1-4}$ alkoxy group), —N⟨ring⟩— or S.

16 Claims, No Drawings

POLYIMIDE AND PROCESS FOR PRODUCING THE SAME

DETAILED EXPLANATION OF THE INVENTION

1) Field of the Invention

The present invention relates to a novel polyimide capable of dissolving in organic solvents and having excellent low temperature moldability, and to a process for producing the same.

2) Related Arts

Hitherto, polymaleimide resins produced from a bismaleimide compound such as N,N'-(4,4'-methylenediphenylene)bismaleimide as a raw material are known to have excellent thermal resistance. The polymaleimide resin which is a homopolymer of a bismaleimide compound and the polymaleimide-polyamine resin which is produced by copolymerizing a polymaleimide with amines have been used in various fields, such as for impregnating varnish, laminates, moldings, etc.

In general, these bismaleimide resins are excellent in thermal resistance, but they are necessary to use in a state of solution, because they are difficult to give plasticity and have a high melting point before curing. In recent years, synthesis of bismaleimide compounds capable of dissolving in various solvent have been studied, because the solvent which can dissolve the bismaleimide resin is restricted to specific solvents having a high boiling point such as N-methyl-2-pyrrolidone and N,N-dimethylacetamide, etc.

However, the polymaleimide resins and polymaleimide-polyamine resins synthesized using bismaleimide compounds having excellent solubility in such solvent have disadvantages that they are insoluble and infusible resins which are inferior in processability, and particularly, it is difficult to form a self-standing flexible film becuase of their remarkably low film-formability.

On the other hand, many studies have been done concerning the so-called Michael polyadducts obtained by reacting bismaleimide with various kinds of diamine or dithiol (Organic Synthetic Chemistry, Vol. 43, No. 10, pages 932–940). This reference discloses many reaction products obtained by reacting bis(4-maleimidophenyl)methane with diamine or dithiol, but hardly describes products soluble in low boiling point non-amide solvents. Although the reference discloses polyimides synthesized from the aliphatic bismaleimide which is soluble in low boiling non-amide solvents, there is a problem that the polyimide can not be industrially used because the yield for synthesis of them is very low.

SUMMARY OF THE INVENTION

Accordingly, the present invention has been done for the purpose of solving such problems in the prior arts. An object of the present invention is to provide novel polyimides capable of dissolving in various kinds of solvent, being excellent in thermal resistance and having good film-formability to form self-standing films, and to provide a process for producing such polyimides.

The first aspect according to the present invention is a polyimide comprising a repeating unit represented by the following formula (1) and having a number average molecular weight of 4,000–200,000:

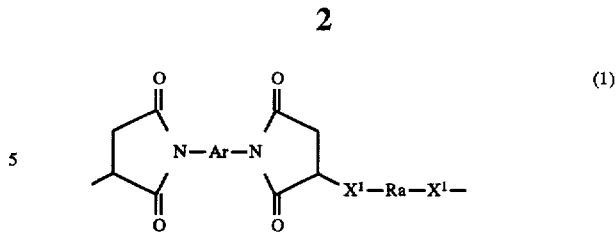

wherein Ar is a divalent group represented by the following formula (2) or (3):

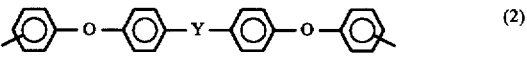

wherein Y is —O—, —CO—, —S—, —S$_2$— or —C(CH$_3$)$_2$—,

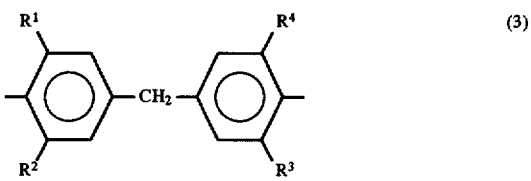

wherein R$^1$, R$^2$, R$^3$ and R$^4$ are each a C$_{1-4}$ alkyl group or a C$_{1-4}$ alkoxy group, Ra is a divalent group having 2–6 benzene rings, X$^1$ represents NH, NR (wherein R is a C$_{1-4}$ alkyl group or a C$_{1-4}$ alkoxy group), or S.

The second aspect according to the present invention is a polyimide comprising a repeating unit represented by the following formula (4) and having a number average molecular weight of 4,000–200,000.

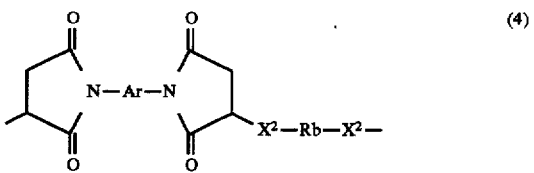

wherein Ar is a divalent group represented by the following formula (2) or (3):

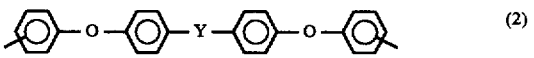

wherein Y is —O—, —CO—, —S—, —SO$_2$— or —C(C$_3$)$_2$—,

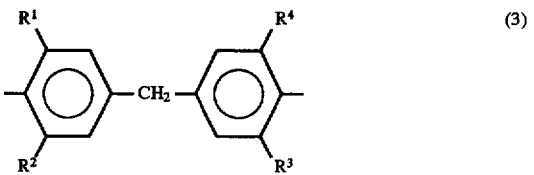

wherein R$^1$, R$^2$, R$^3$ and R$^4$ are each a C$_{1-4}$ alkyl group or a C$_{1-4}$ alkoxy group, Rb is a C$_{2-20}$ alkylene group, an ether group represented by the formula: —CH$_2$CH$_2$(OCH$_2$CH$_2$)$_n$— (wherein n is an integer of 1–8) or a dimethylsiloxane group represented by the formula: —R'—[Si(CH$_3$)$_2$O]$_m$Si(CH$_3$)$_2$—R'— (wherein R' is a C$_{1-10}$ alkyl group or —CH$_2$OC$_6$H$_4$—, and m is an integer of 1–20), X$^2$ represents NH, NR (wherein R is a C$_{1-4}$ alkyl group or a C$_{1-4}$ alkoxy group),

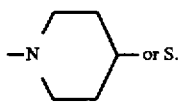

The third aspect according to the present invention is a polyimide comprising a repeating unit represented by the above formula (1) and a repeating unit represented by the above formula (4) in an arbitrary ratio and having a number average molecular weight of 4,000–200,000. In this polyimide, when the ratio of the repeating unit represented by the formula (4) is increased, the glass transition point of the polyimide becomes low.

The above polyimide of the first aspect according to the present invention can be produced by reacting a bismaleimide represented by the following formula (6) with a compound represented by the following formula (7) in a presence of active hydrogen:

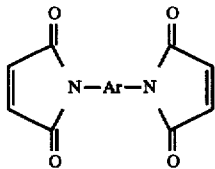

wherein Ar denotes a divalent group represented by the above formula (2) or (3), $$HX^1—R_a—X^1H \qquad (7)$$

wherein Ra is a divalent group having 2–6 benzene rings, and $X^1$ represents NH, NR (wherein R is a $C_{1-4}$ alkyl group or a $C_{1-4}$ alkoxy group) or S.

The above polyimide of the second aspect according to the present invention can be produced by reacting a bismaleimide represented by the above formula (6) with a compound represented by the following formula (8) in a presence of active hydrogen:

$$HX^2—R_b—X^2H \qquad (8)$$

wherein Rb is a $C_{2-20}$ alkylene group, an ether group represented by the formula: —$CH_2CH_2(OCH_2CH_2)_n$— (wherein n is an integer of 1–8) or a dimethylsiloxane group represented by the formula: —R'—$[Si(CH_3)_2O]_mSi(CH_3)_2$—R'— (wherein R' is a $C_{1-10}$ alkyl group or —$CH_2OC_6H_4$—, and m is an integer of 1–20), and $X^2$ represents NH, NR (wherein R is a $C_{1-4}$ alkyl group or a $C_{1-4}$ alkoxy group),

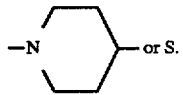

The above polyimide of the third aspect according to the present invention can be produced by reacting a bismaleimide represented by the above formula (6) with a compound represented by the above formula (7) and a compound represented by the above formula (8) in a presence of active hydrogen.

The polyimides of the first, the second and the third aspects according to the present invention can be generally used as soluble thermoplastic resins. Of these polyimides, those represented by the formula (1) wherein $X^1$ is NH and those represented by the formula (4) wherein $X^2$ is NH can be used as reactive polyimide resins, thermosetting polyimide resins or photo-curing polyimide resins, because the second amino group in the polyimide chain is rich in reactivity with maleimide, acid anhydride, isocyanate and epoxy compounds.

DETAILED DESCRIPTION OF PREFERRED EMBODIMENTS

In the following discussion, the present invention will be explained in detail.

In the polyimides of the present invention, the bismaleimide which composes the basic repeating unit of the polyimides is a compound having two maleimide groups in the molecule, which is represented by the following formula (6).

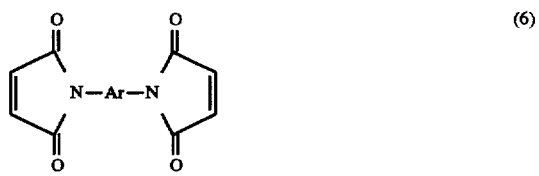

wherein Ar is a divalent group represented by the following formula (2) or (3):

wherein Y represents —O—, —CO—, —S—, —$SO_2$— or —$C(CH_3)_2$—,

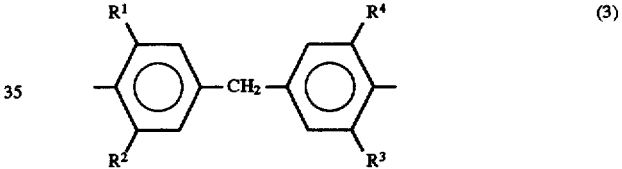

wherein $R^1$, $R^2$, $R^3$ and $R^4$ are each a $C_{1-4}$ alkyl group or a $C_{1-4}$ alkoxy group.

Examples of the above mentioned bismaleimide include the following compounds. Examples of the bismaleimide wherein Ar is represented by the formula (2) include 4,4'-bis(3-maleimidophenoxy)diphenyl ether, 4,4'-bis(3-maleimidophenoxy)benzophenone, 4,4'-bis(3-maleimidophenoxy)diphenyl sulfide, 4,4'-bis(3-maleimidophenoxy)diphenyl sulfone and 2,2'-bis(p-maleimidophenoxyphenyl)propane, etc. Examples of the bismaleimide wherein Ar is represented by the formula (3) include bis(4-maleimide-3,5-dimethylphenyl)methane, bis(4-maleimide-3,5-diethylphenyl)methane, bis(4-maleimide-3,5-dipropylphenyl)methane, bis(4-maleimide-3,5-diisopropylphenyl)methane, bis(4-maleimide-3,5-dibutylphenyl)methane, bis(4-maleimide-3-methyl-5-ethylphenyl)methane, bis(4-maleimide-3,5-dimethoxyphenyl)methane, bis(4-maleimide-3,5-diethoxyphenyl)methane, bis(4-maleimide-3,5-dipropoxyphenyl)methane, bis(4-maleimide-3,5-diisopropoxyphenyl)methane, bis(4-maleimide-3,5-dibutoxyphenyl)methane, bis(4-maleimide-3-methoxy-5-ethoxyphenyl)methane, etc.

The bismaleimide represented by the following formula (7) composing another basic repeating unit of the polyimide according to the present invention includes two kinds of compounds, that is, diamines having the amino group in both ends and dithiols having the mercapto group in both ends.

HX¹—Ra—X¹H  (7)

wherein Ra is a divalent group having 2–6 benzene rings, and X¹ is NH, NR(wherein R is a $C_{1-4}$ alkyl group or a $C_{1-4}$ alkoxy group) or S.

Of the polyimide synthesized using the compound represented by the formula (7), it is preferred for the purpose of improving solubility in the solvent that the Ra in the formula (7) has two or more benzene rings which are bonded through —O—, —S—, —CH₂—, —C(=O)—, —CONH—, —COO—, —SO₂—, —C(CH₃)₂— or —C(CF₃)₂— in meta or para positions. Hydrogen atoms of each benzene ring may be substituted by suitable substituents.

The diamines having the amino group in both ends represented by the formula (7) include primary diamines in which X¹ is NH and secondary diamines in which X¹ is NR wherein R is a $C_{1-4}$ alkyl group.

Examples of the primary diamines represented by the formula (7) include 3,4'-oxydianiline, 4,4'-oxydianiline, 4,4'-diaminodiphenylmethane, 3,4'-diaminodiphenylmethane, 3,3'-diaminodiphenylmethane, 4,4'-diamino-3,3'-dimethyldiphenylmethane, 4,4'-diamino-3,3'-diethyldiphenylmethane, 4,4'-diamino-3,3'-dimethoxydiphenylmethane, 4,4'-diamino-3,3'-diethoxydiphenylmethane, 4,4'-diaminobenzanilide, 4,4'-diaminobenzophenone, 3,3'-diaminobenzophenone, 4,4'-diaminodiphenyl sulfone, 3,3'-diaminodiphenyl sulfone, 4,4'-(isopropylidene)dianiline, 3,3'-(isopropylidene)dianiline, 4,4'-diaminobenzophenone, bis[2-(4-aminophenyl)propane]benzene, bis(aminophenoxy)benzene, bis(aminophenoxy)biphenyl, bis(aminophenoxy)diphenyl ether, bis(aminophenoxyphenyl)propane, bis(aminophenoxyphenyl)sulfone, bis(aminophenoxyphenyl)ketone, bis(aminophenoxyphenyl)hexafluoropropane, bis(aminophenoxyphenyl)biphenyl, bis(aminophenoxyphenyl)diphenyl ether, 4,4'-bis[3-(4-amino-α,α-dimethylbenzyl)phenoxy]diphenyl sulfone, 4,4'-bis[3-(4-amino-α,α-dimethylbenzyl)phenoxy]benzophenone, 4,4'-bis[4-(4-amino-α,α-dimethylbenzyl)phenoxy]diphenyl sulfone, 4,4'-bis[4-(4-amino-α,α-dimethylbenzyl)phenoxy]benzophenone, 9,9-bis(4-aminophenyl)fluorene, etc. These compounds can be used as a mixture.

Examples of the secondary diamines represented by the formula (7) include 4,4'-di(N-methylamino)diphenylmethane, 3,4'-di(N-methylamino)diphenylmethane, 4,4'-di(N-methylamino)diphenyl ether, 3,4'-di(N-methylamino)diphenyl ether, 4,4'-di(N-methylamino)benzanilide, 4,4'-di(N-methylamino)benzophenone, 3,3'-di(N-methylamino)benzophenone, etc.

Of the compounds represented by the formula (7), examples of dithiols in which the functional group X¹ is mercapto group include 3,4'-dimercaptodiphenyl ether, 4,4'-dimercaptodiphenyl ether as well as compounds in which "amino" in the above exemplified primary diamines is replaced with "mercapto" or "thiol".

The compounds represented by the following formula (8) composing a further basic repeating unit of the polyimide according to the present invention include two kinds of compounds, that is, diamines having the amino group in both ends and dithiols having the mercapto group in both ends.

HX²—Rb—X²H  (8)

wherein Rb is a $C_{2-20}$ alkylene group, an ether group represented by the formula: —CH₂CH₂(OCH₂CH₂)ₙ— (wherein n is an integer of 1–8) or a dimethylsiloxane group represented by the formula: —R'—[Si(CH₃)₂O]ₘSi(CH₃)₂—R'— (wherein R' is a $C_{1-10}$ alkyl group or —CH₂OC₆H₄—, and m is an integer of 1–20), and X² represents NH, NR (wherein R is a $C_{1-4}$ alkyl group or a $C_{1-4}$ alkoxy group),

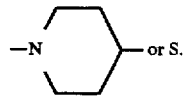

The diamines having the amino group in both ends include primary diamines in which X² is NH, secondary diamines in which X² is NR wherein R is a $C_{1-4}$ alkyl group and secondary diamines in which X² is a group represented by the following formula (5)

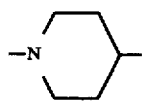  (5)

Examples of the primary diamines represented by the formula (8) include ethylenediamine, propylenediamine, 1,4-diaminobutane, hexamethylenediamine, octamethylenediamine, decamethylenediamine, hexadecamethylenediamine, dodecamethylenediamine, di(aminoethyl)ether, 1,8-diamino-3,6-dioxaoctane, 1,11-diamino-3,6,9-trioxaundecane, 1,3-bis(3-aminopropyl)-1,1,3,3-tetramethyldisiloxane, 1,3-bis(10-aminodecyl)-1,1,3,3-tetramethyldisiloxane, 1,3-bis(3-aminophenoxymethyl)-1,1,3,3-tetramethyldisiloxane and α,ω-bis(3-aminopropyl)polydimethylsiloxane represented by the following formula:

H₂NCH₂CH₂CH₂[Si(CH₃)₂O]ₙSi(CH₃)₂CH₂CH₂CH₂NH₂ wherein n is 3 or 7.

Examples of the secondary diamines in which the functional group X² in the formula (8) is NR include N,N'-dimethylethylenediamine, N,N'-dimethylpropylenediamine, N,N'-dimethyl-1,4-diaminobutane, N,N'-dimethylhexamethylenediamine, N,N'-dimethyloctamethylenediamine, N,N'-dimethyldecamethylenediamine, N,N'-dimethylhexadecamethylenediamine, N,N'-dimethyldodecamethylenediamine, etc.

Examples of the secondary diamines in which the functional group X² is a cyclic secondary diamine group include 1,3-di(4-piperidyl)propane, 1,4-di(4-piperidyl)butane, 1,6-di(4-piperidyl)hexane, 1,8-di(4-piperidyl)octane, 1,10-di(4-piperidyl)decane, etc.

Examples of the dithiols in which the functional group X² in the formula (8) is a mercapto group include compounds in which "amino" in the above exemplified primary diamines and secondary diamines is replaced with "mercapto" or "thiol".

The polyimides of the first aspect to the third aspect according to the present invention which are novel polyimides produced using the above described raw materials should have a number average molecular weight of from 4,000 to 200,000 and preferably from 8,000 to 100,000. When the number average molecular weight is below 4,000, the film formability becomes insufficient and the thermal resistance of the film itself, if be formed, is insufficient. On the other hand, when the number molecular weight is above 200,000, the polyimide has a poor solubility in organic solvents, and the processing thereof is difficult to carry out, because the viscosity of the solution becomes high if it dissolves in the organic solvent to produce a solution.

The number average molecular weight used in the present invention is a value determined by gel permeation chromatography (GPC), and indicated as polystyrene using tetrahydrofuran as an eluent and Shodex 80M×2 as columns.

In the following, the process for producing the polyimide of the present invention will be described.

The polyimides of the present invention can be produced each by reacting the bismaleimide compound with a diamine, a dithiol or a mixture of them in an organic solvent, if necessary, in the presence of a tertiary amine catalyst such as tributyl amine, triethyl amine, etc. (in an amount of 20% by weight or less based on the reaction mixture) at −10° C.–200° C., preferably at 0° C.–130° C. for 1–48 hours. In case that the diamine or dithiol to be allowed to react with the bismaleimide compound is an aliphatic compound represented by the formula (8), it is particularly preferred to react at a relatively low reaction temperature of from 0° to 50° C. because of higher reactivity of the aliphatic diamines and the like with the maleimide.

Examples of the organic solvents used in the above-mentioned reaction include protonic phenol solvents such as phenol, cresol, xylenol, p-chlorophenol, etc., and mixtures prepared by adding 1–100 parts by weight of acetic acid, propionic acid, butyric acid, isobutyric acid, valeric acid, hexanoic acid, benzoic acid, p-toluenesulfonic acid, camphorsulfonic acid, etc. to 100 parts by weight of an aprotic polar solvent such as N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, etc. When the above solvent having active hydrogens is not present in the reaction mixture, the reaction of the bismaleimide can not be controlled to result in producing only insoluble polyimides, whereby the object of the present invention can not be attained. If necessary, solvents such as benzene, toluene, methyl ethyl ketone, acetone, tetrahydrofuran, dioxane, monoglyme, diglyme, methylcellosolve, cellosolve acetate, methanol, ethanol, isopropanol, methylene chloride, chloroform, trichlene, nitrobenzene, etc. can be mixed with the above-mentioned solvents as a mixture.

In the present invention, polyimides having a high degree of polymerization can be produced by the reaction between equimolar amounts of the bismaleimide and the diamine or dithiol. If necessary, the molar ratio of bismaleimide to diamine or dithiol can be varied in a range of from 11:10 to 10:11, by which the polyimide can be produced.

The polyimide resins obtained by the present invention are soluble in various organic solvents such as aprotic polar solvents, e.g., N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, etc., phenol solvents such as phenol, cresol, xylenol, p-chlorophenol, etc., isophorone, cyclohexanone, carbitol acetate, diglyme, dioxane, tetrahydrofuran, etc., and have a low glass transition point, excellent low temperature moldability and thermal resistance as high as about 200° C.

EXAMPLE

The present invention will now be described in greater detail.

Example 1

Into a flask equipped with a stirrer were introduced 28.53 g (50 mmol) of 2,2-bis(p-maleimidophenoxyphenyl) propane, 7.21 g (50 mmol) of octamethylenediamine and 250 ml of m-cresol at room temperature, and stirring was continued for 6 hours. After the resultant polyimide varnish was poured in methanol, the resultant precipitate was separated, pulverized, washed and dried to produce 34.0 g (yield 95%) of a polyimide (the second aspect) comprising the repeating unit of the formula (4).

When infrared absorption spectra of the resultant polyimide were measured, typical absorptions of succinimide were observed at 1715 $cm^{-1}$ and 1785 $cm^{-1}$ and the absorption at 690 $cm^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility of this polyimide in organic solvents was confirmed by observing the solving state of the 5 wt. % polyimide solution at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, tetrahydrofuran (THF) and chloroform.

The polyimide was dissolved in THF so as to be a concentration of 20% by weight. After the resultant varnish was cast on a glass plate, it was dried at 100° C. for 10 minutes to produce a self-standing tough film. When the film was bent 180° in order to carry out a flexibility test, the film showed good flexibility without cracking.

Example 2

Using 28.53 g (50 mmol) of 2,2-bis(p-maleimidophenoxyphenyl)propane, 7.21 g (50 mmol) of N,N'-dimethylhexamethylenediamine and 250 ml of m-cresol, 33.0 g (yield 92%) of a polyimide of the second aspect was obtained by a similar manner as in Example 1. When infrared absorption spectra of the resultant polyimide were measured, typical absorptions of succinimide were observed at 1715 $cm^{-1}$ and 1785 $cm^{-1}$ and the absorption at 690 $cm^{-1}$ assigned to the double bond of the maleimide group disappeared. Moreover, the molecular weight, glass transition point and temperature of initiating the thermal decomposition of the polyimide resin were measured. Results obtained are shown in Table 1.

The solubility test and the flexibility test of the resultant polyimide determined as in Example 1 gave the same results as those in Example 1.

Example 3

Using 28.53 g (50 mmol) of 2,2-bis(p-maleimidophenoxyphenyl)propane, 9.32 g (50 mmol) of 1,3-di(4-piperidyl)propane and 250 ml of m-cresol, 35.0 g (yield 92%) of a polyimide of the second aspect was obtained by a similar manner as in Example 1. When infrared absorption spectra of the resultant polyimide were measured, typical absorptions of succinimide were observed at 1710 $cm^{-1}$ and 1780 $cm^{-1}$ and the absorption at 690 $cm^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 4

Using 28.53 g (50 mmol) of 2,2-bis(p-maleimidophenoxyphenyl)propane, 8.62 g (50 mmol) of 1,10-diaminodecane and 250 ml of m-cresol, 35.0 g (yield 94%) of a polyimide of the second aspect was obtained by a similar manner as in Example 1. When infrared absorption spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 5

Using 28.53 g (50 mmol) of 2,2-bis(p-maleimidophenoxyphenyl)propane, 12.43 g (50 mmol) of 1,3-bis(3-aminopropyl)-1,1,3,3-tetramethyldisiloxane and 250 ml of m-cresol, 40.0 g (yield 98%) of a polyimide of the second aspect was obtained by a similar manner as in Example 1. When infrared absorption spectra of the resultant polyimide were measured, typical absorptions of succinimide were observed at 1717 cm$^{-1}$ and 1789 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 6

Using 28.53 g (50 mmol) of 2,2-bis(p-maleimidophenoxyphenyl)propane, 9.11 g (50 mmol) of 1,8-dimercapto-3,5-dioxaoctane and 250 ml of m-cresol, 37.0 g (yield 98%) of a polyimide of the second aspect was obtained by a similar manner as in Example 1 in the presence of 1 ml of triethylamine as a catalyst. When infrared absorption spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 7

Using 28.53 g (50 mmol) of 2,2-bis(p-maleimidophenoxyphenyl)propane, 7.51 g (50 mmol) of 1,6-dimercaptohexane and 250 ml of m-cresol, 35.6 g (yield 99%) of a polyimide of the second aspect was obtained by a similar manner as in Example 1 in the presence of 1 ml of triethylamine as a catalyst. When infrared absorption spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 8

Using 22.12 g (50 mmol) of bis(4-maleimido-3-ethyl-5-methylphenyl)methane, 7.21 g (50 mmol) of octamethylenediamine and 250 ml of m-cresol, 28.0 g (yield 95%) of a polyimide of the second aspect was obtained by a similar manner as in Example 1. When infrared absorption spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 9

Using 22.12 g (50 mmol) of bis(4-maleimido-3-ethyl-5-methylphenyl)methane, 7.21 g (50 mmol) of N,N'-dimethylhexamethylenediamine and 250 ml of m-cresol, 25.0 g (yield 85%) of a polyimide of the second aspect was obtained by a similar manner as in Example 1. When infrared absorption spectra of the resultant polyimide were measured, typical absorptions of succinimide were observed at 1716 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 10

Using 22.12 g (50 mmol) of bis(4-maleimido-3-ethyl-5-methylphenyl)methane, 9.32 g (50 mmol) of 1,3-di(4-piperidyl)propane and 250 ml of m-cresol, 30.0 g (yield 95%) of a polyimide of the second aspect was obtained by a similar manner as in Example 1. When infrared absorption spectra of the resultant polyimide were measured, typical absorptions of succinimide were observed at 1710 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 11

Using 22.12 g (50 mmol) of bis(4-maleimido-3-ethyl-5-methylphenyl)methane, 8.62 g (50 mmol) of 1,10-diaminodecane and 250 ml of m-cresol, 28.0 g (yield 91%) of a polyimide of the second aspect was obtained by a similar manner as in Example 1. When infrared absorption

11 spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 12

Using 22.12 g (50 mmol) of bis(4-maleimido-3-ethyl-5-methylphenyl)methane, 12.43 g (50 mmol) of 1,3-bis(3-aminopropyl)-1,1,3,3-tetramethyldisiloxane and 250 ml of m-cresol, 32.0 g (yield 93%) of a polyimide of the second aspect was obtained by a similar manner as in Example 1. When infrared absorption spectra of the resultant polyimide were measured, typical absorptions of succinimide were observed at 1718 cm$^{-1}$ and 1790 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 13

Using 22.12 g (50 mmol) of bis(4-maleimido-3-ethyl-5-methylphenyl)methane, 9.11 g (50 mmol) of 1,8-dimercapto-3,5-dioxaoctane and 250 ml of m-cresol, 30.0 g (yield 96%) of a polyimide of the second aspect was obtained by a similar manner as in Example 1 in the presence of 1 ml of triethyl amine as a catalyst. When infrared absorption spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

Example 14

Using 22.12 g (50 mmol) of bis(4-maleimido-3-ethyl-5-methylphenyl)methane, 7.51 g (50 mmol) of 1,6-dimercaptohexane and 250 ml of m-cresol, 28.0 g (yield 94%) of a polyimide of the second aspect was obtained by a similar manner as in Example 1 in the presence of 1 ml of triethyl amine as a catalyst. When infrared absorption spectra of the resultant polyimide were measured, typical absorptions of succinimide were observed at 1715 cm$^{-1}$ and 1785 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 1 gave the same results as those in Example 1.

12

Example 15

Using 28.53 g (50 mmol) of 2,2-bis(p-maleimidophenoxyphenyl)propane, 10.01 g (50 mmol) of 3,4'-diaminodiphenyl ether and 250 ml of m-cresol, 38.0 g (yield 99%) of a polyimide (the first aspect) comprising the repeating unit represented by the formula (I) was obtained by a similar manner as in Example 1 except that the reaction temperature was 100° C. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility of this polyimide in organic solvents was confirmed by observing the dissolving state of the 5 wt. % polyimide solution at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, tetrahydrofuran and chloroform.

The polyimide was dissolved in tetrahydrofuran so as to be a concentration of 20% by weight. After the resultant varnish was cast on a glass plate, it was dried at 100° C. for 10 minutes to produce a self-standing tough film. When the film was bent 180° in order to carry out a flexibility test, the film showed good flexibility without cracking.

Example 16

Using 28.53 g (50 mmol) of 2,2-bis(p-maleimidophenoxyphenyl)propane, 9.91 g (50 mmol) of 4,4'-diaminodiphenylmethane and 250 ml of m-cresol, 38.0 g (yield 99%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption,at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 17

Using 28.53 g (50 mmol) of 2,2-bis(p-maleimidophenoxyphenyl)propane, 14.12 g (50 mmol) of di(4-amino-3-ethyl-5-methylphenyl)methane and 250 ml of m-cresol, 42.0 g (yield 98%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 18

Using 28.53 g (50 mmol) of 2,2-bis(p-maleimidophenoxyphenyl)propane, 12.7 g (50 mmol) of di(4-amino-3,5-dimethylphenyl)methane and 250 ml of m-cresol, 41.0 g (yield 99%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 19

Using 28.53 g (50 mmol) of 2,2-bis(p-maleimidophenoxyphenyl)propane, 15.5 g (50 mmol) of di(4-amino-3,5-diethylphenyl)methane and 250 ml of m-cresol, 44.0 g (yield 100%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 20

Using 28.53 g (50 mmol) of 2,2-bis(p-maleimidophenoxyphenyl)propane, 12.42 g (50 mmol) of 4,4'-diaminodiphenyl sulfone and 250 ml of m-cresol, 34.0 g (yield 83%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 21

Using 28.53 g (50 mmol) of 2,2-bis(p-maleimidophenoxyphenyl)propane, 11.37 g (50 mmol) of 4,4'-diaminobenzanilide and 250 ml of m-cresol, 39.5 g (yield 99%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 22

Using 28.53 g (50 mmol) of 2,2-bis(p-maleimidophenoxyphenyl)propane, 20.53 g (50 mmol) of 2,2-bis[4-(4-aminophenoxy)phenyl]propane and 250 ml of m-cresol, 48.0 g (yield 98%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 23

Using 28.53 g (50 mmol) of 2,2-bis(p-maleimidophenoxyphenyl)propane, 17.23 g (50 mmol) of 1,3-bis[2-(4-aminophenyl)isopropyl]benzene and 250 ml of m-cresol, 45.0 g (yield 98%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 24

Using 28.53 g (50 mmol) of 2,2-bis(p-maleimidophenoxyphenyl)propane, 17.23 g (50 mmol) of 1,4-bis[2-(4-aminophenyl)isopropyl]benzene and 250 ml of m-cresol, 45.0 g (yield 98%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 25

Using 28.53 g (50 mmol) of 2,2-bis(p-maleimidophenoxyphenyl)propane, 18.42 g (50 mmol) of 4,4'-bis(4-aminophenoxy)biphenyl and 250 ml of m-cresol, 46.0 g (yield 98%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 26

Using 28.53 g (50 mmol) of 2,2-bis(p-maleimidophenoxyphenyl)propane, 14.62 g (50 mmol) of 1,4-bis(4-aminophenoxy)benzene and 250 ml of m-cresol, 43.0 g (yield 99%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 27

Using 28.53 g (50 mmol) of 2,2-bis(p-maleimidophenoxyphenyl)propane, 14.62 g (50 mmol) of 1,4-bis(3-aminophenoxy)benzene and 250 ml of m-cresol, 45.0 g (yield 98%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 28

Using 28.53 g (50 mmol) of 2,2-bis(p-maleimidophenoxyphenyl)propane, 8.71 g (50 mmol) of 9,9-bis(4-aminophenoxy)fluorene and 250 ml of m-cresol, 37.0 g (yield 99%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 29

Using 28.53 g (50 mmol) of 2,2-bis(p-maleimidophenoxyphenyl)propane, 12.22 g (50 mmol) of 3,3'-dimethoxy-4,4'-diaminobiphenyl and 250 ml of m-cresol, 38.0 g (yield 93%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 30

Using 28.53 g (50 mmol) of 2,2-bis(p-maleimidophenoxyphenyl)propane, 10.62 g (50 mmol) of 3,3'-dimethyl-4,4'-diaminobiphenyl and 250 ml of m-cresol, 33.0 g (yield 84%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 31

Using 28.53 g (50 mmol) of 2,2-bis(p-maleimidophenoxyphenyl)propane, 21.63 g (50 mmol) of bis[4-(4-aminophenoxy)phenyl]sulfone and 250 ml of m-cresol, 49.0 g (yield 97%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 32

Using 28.53 g (50 mmol) of 2,2-bis(p-maleimidophenoxyphenyl)propane, 25.93 g (50 mmol) of 2,2-bis[4-(4-aminophenoxy)phenyl]hexafluoropropane and 250 ml of m-cresol, 52.0 g (yield 95%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 33

Using 27.83 g (50 mmol) of 4,4'-bis(m-maleimidophenoxy)benzophenone, 20.53 g (50 mmol) of 2,2-bis[4-(4-aminophenoxy)phenyl]propane and 250 ml of m-cresol, 47.0 g (yield 97%) of a polyimide of the first aspect was obtained by a similar manner as in Example 15. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 34

Using 28.03 g (50 mmol) of bis[4-(3-maleimidophenoxy) phenyl]sulfide, 20.53 g (50 mmol) of 2,2-bis[4-(4-aminophenoxy)phenyl]propane and 250 ml of m-cresol, 47.5 g (yield 98%) of a polyimide of the first aspect was obtained by a similar manner as in Example 15. When infrared absorption spectra of the resultant polyimide were measured, typical absorptions of succinimide were observed at 1720 cm$^{-1}$ and 1790 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 35

Using 29.63 g (50 mmol) of 4,4'-bis(m-maleimidophenoxy)benzophenone, 20.53 g (50 mmol) of 2,2-bis[4-(4-aminophenoxy)phenyl]propane and 250 ml of m-cresol, 49.0 g (yield 98%) of a polyimide of the first aspect was obtained by a similar manner as in Example 15. When infrared absorption spectra of the resultant polyimide were measured, typical absorptions of succinimide were observed at 1718 cm$^{-1}$ and 1788 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 15 gave the same results as those in Example 15.

Example 36

28.53 g (50 mmol) of 2,2-bis(m-maleimidophenoxyphenyl)propane and 6.21 g (25 mmol) of 1,3-bis(3-aminopropyl)-1,1,3,3-tetramethyldisiloxane were introduced into 250 ml of m-cresol. After the mixture was allowed to react at room temperature for 4 hours, 10.26 g (25 mmol) of 2,2-bis(p-aminophenoxyphenyl)propane were added to the mixture, followed by reacting at 100° C. for 4 hours. After the resultant polyimide varnish was poured in methanol, the resultant precipitate was separated, pulverized, washed and dried to produce 42.0 g (yield 93%) of a polyimide (the third aspect) comprising the repeating unit of the formula (1) and the repeating unit of the formula (4). When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility of this polyimide in organic solvents was confirmed by observing the solving state of the 5 wt. % polyimide solution at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, tetrahydrofuran and chloroform.

The polyimide was dissolved in THF so as to be a concentration of 20% by weight. After the resultant varnish was cast on a glass plate, it was dried at 100° C. for 10 minutes to produce a self-standing tough film. When the film was bent 180° in order to carry out a flexibility test, the film showed good flexibility without cracking.

Example 37

28.53 g (50 mmol) of 2,2-bis(m-maleimidophenoxyphenyl)propane and 4.56 g (25 mmol) of 1,8-dimercapto-3,5-dioxaoctane were introduced into 250 ml of m-cresol. After the mixture was allowed to react at room temperature for 4 hours, 10.26 g (25 mmol) of 2,2-bis(p-aminophenoxyphenyl)propane were added to the mixture, followed by reacting at 100° C. for 4 hours. After the resultant polyimide varnish was poured in methanol, the resultant precipitate was separated, pulverized, washed and dried to produce 41.0 g (yield 95%) of a polyimide of the third aspect. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 36 gave the same results as those in Example 36.

Example 38

28.53 g (50 mmol) of 2,2-bis(m-maleimidophenoxyphenyl)propane and 6.21 g (25 mmol) of 1,3-bis(3-aminopropyl)-1,1,3,3-tetramethyldisiloxane were introduced into 250 ml of m-cresol. After the mixture was allowed to react at room temperature for 4 hours, 4.96 g (25 mmol) of 4,4'-diaminodiphenylmethane were added to the mixture, followed by reacting at 100° C. for 4 hours. After the resultant polyimide varnish was poured in methanol, the resultant precipitate was separated, pulverized, washed and dried to produce 37.0 g (yield 93%) of a polyimide of the third aspect. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 36 gave the same results as those in Example 36.

Example 39

28.53 g (50 mmol) of 2,2-bis(m-maleimidophenoxyphenyl)propane and 4.56 g (25 mmol) of 1,8-dimercapto-3,5-dioxaoctane were introduced into 250 ml of m-cresol. After the mixture was allowed to react at room temperature for 4 hours, 4.96 g (25 mmol) of 4,4'-diaminodiphenylmethane were added to the mixture, followed by reacting at 100° C. for 4 hours. After the resultant polyimide varnish was poured in methanol, the resultant precipitate was separated, pulverized, washed and dried to produce 36.0 g (yield 95%) of a polyimide of the third aspect. When infrared absorption spectra of the resultant polyimide were measured, typical absorptions of succinimide were observed at 1705 cm$^{-1}$ and 1780 cm$^{-1}$ and the absorption at 690 cm$^{-1}$ assigned to the double bond of the maleimide group disappeared. Moreover, the molecular weight, glass transition point and temperature of initiating thermal decomposition of the polyimide resin were measured. Results obtained are shown in Table 1.

The solubility test and the flexibility test of the resultant polyimide determined as in Example 36 gave the same results as those in Example 36.

TABLE 1

| Example No. | Number average molecular weight (× 10$^4$) | Glass transition point (°C.) | Temperature of initiating thermal decomposition (°C.) |
|---|---|---|---|
| 1 | 2.33 | 77 | 360 |
| 2 | 2.53 | 92 | 233 |
| 3 | 1.55 | 150 | 280 |
| 4 | 2.54 | 70 | 290 |
| 5 | 2.89 | 66 | 390 |
| 6 | 3.51 | 77 | 335 |
| 7 | 2.59 | 90 | 230 |
| 8 | 2.03 | 81 | 270 |
| 9 | 2.30 | 94 | 252 |
| 10 | 1.22 | 158 | 280 |
| 11 | 2.04 | 80 | 280 |
| 12 | 2.22 | 75 | 280 |
| 13 | 3.00 | 85 | 350 |
| 14 | 2.89 | 100 | 230 |
| 15 | 1.00 | 150 | 340 |
| 16 | 3.57 | 151 | 334 |
| 17 | 1.89 | 150 | 303 |
| 18 | 2.56 | 160 | 300 |
| 19 | 2.85 | 140 | 300 |
| 20 | 1.08 | 130 | 290 |
| 21 | 2.56 | 160 | 348 |
| 22 | 3.64 | 190 | 356 |
| 23 | 3.61 | 130 | 345 |
| 24 | 3.28 | 160 | 350 |
| 25 | 2.70 | 198 | 360 |
| 26 | 2.89 | 192 | 314 |
| 27 | 2.73 | 156 | 320 |

TABLE 1-continued

| Example No. | Number average molecular weight (× 10$^4$) | Glass transition point (°C.) | Temperature of initiating thermal decomposition (°C.) |
|---|---|---|---|
| 28 | 2.29 | 202 | 362 |
| 29 | 1.33 | 160 | 320 |
| 30 | 2.01 | 160 | 330 |
| 31 | 1.89 | 130 | 325 |
| 32 | 2.56 | 160 | 320 |
| 33 | 2.22 | 120 | 300 |
| 34 | 2.34 | 120 | 270 |
| 35 | 2.47 | 110 | 280 |
| 36 | 5.01 | 142 | 243 |
| 37 | 3.80 | 100 | 356 |
| 38 | 4.39 | 124 | 356 |
| 39 | 3.54 | 100 | 344 |

In the Table 1, the measurement of the molecular weight by gel permeation chromatography (GPC) was carried out using tetrahydrofuran as an eluent and Shodex 80M×2 as columns. The value of the molecular weight is calculated as polystyrene. The glass transition point was determined by a differential thermal analysis by DSC (in a nitrogen atmosphere, heated at 10° C./min.) and the temperature of initiating thermal decomposition was determined by a thermogravimetry (TGA) (in a nitrogen atmosphere, heated at 10° C./min.)

The polyimides of the present invention are not only soluble in various organic solvent including solvents having a low boiling point and solvents having high boiling point, but have an advantage of easy molding and processing because of high solubility in the solvents. Further, they are resins having a low glass transition point and excellent thermal resistance. Consequently, the polyimides obtained by the present invention can be utilized in widely applied fields as varnish, molded articles, adhesives, constructing materials, and the like.

We claim:

1. A polyimide comprising a repeating unit represented by the following formula (1) and having a number average molecular weight of 4,000–200,000:

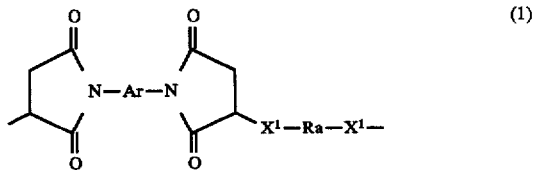

(1)

wherein Ar is a divalent group represented by the following formula (2) or (3):

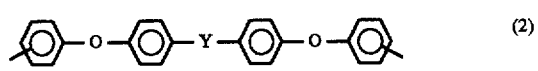

(2)

wherein Y is —O—, —CO—, —S—, —SO$_2$— or —C(CH$_3$)$_2$—,

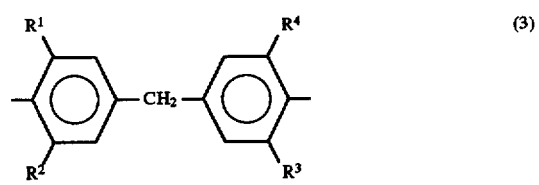

(3)

wherein R$^1$, R$^2$, R$^3$ and R$^4$ are each a C$_{1-4}$ alkyl group or a C$_{1-4}$ alkoxy group, provided that R$^1$, R$^2$, R$^3$ and R$^4$ are not all methyl, Ra is a divalent group having 2–6 benzene rings, X¹ represents NH, NR (wherein R is a $C_{1-4}$ alkyl group or a $C_{1-4}$ alkoxy group) or S.

2. A polyimide comprising a repeating unit represented by the following formula (4) and having a number average molecular weight of 4,000–200,000:

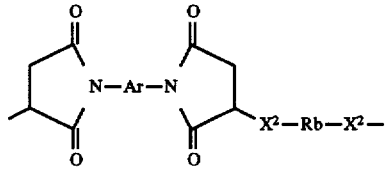
(4)

wherein Ar is a divalent group represented by the following formula (2) or (3):

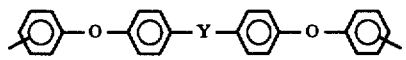
(2)

wherein Y is —O—, —CO—, —S—, —SO₂— or —C(C₃)₂—,

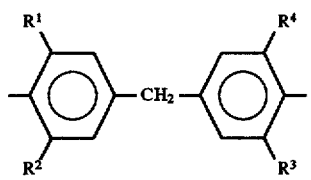
(3)

wherein $R^1$, $R^2$, $R^3$ and $R^4$ are each a $C_{1-4}$ alkyl group or a $C_{1-4}$ alkoxy group, provided that $R^1$, $R^2$, $R^3$, and $R^4$ are not all methyl, Rb is a $C_{2-20}$ alkylene group, an ether chain represented by the formula: —CH₂CH₂(OCH₂CH₂)ₙ— (wherein n is an integer of 1–8) or a dimethylsiloxane group represented by the formula: —R'—[Si(CH₃)₂O]ₘSi(CH₃)₂—R'— (wherein R' is a $C_{1-10}$ alkyl group or —CH₂OC₆H₄—, and m is an integer of 1–20), X² represents NH, NR (wherein R is a $C_{1-4}$ alkyl group or a $C_{1-4}$ alkoxy group),

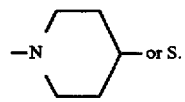 or S.

3. A polyimide comprising a repeating unit represented by the following formula (1) and a repeating unit represented by the following formula formula (4) in an arbitrary ratio and having a number average molecular weight of 4,000–200,000:

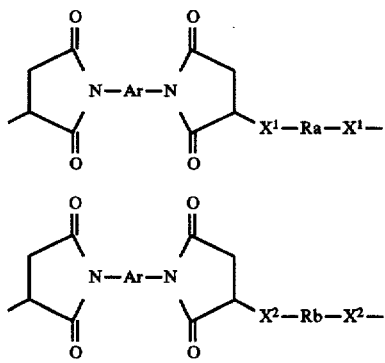
(1)

(4)

wherein Ar is a divalent group represented by the following formula (2) or (3):

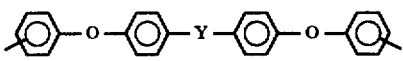
(2)

wherein Y is —O—, —CO—, —S—, —SO₂— or —C(C₃)₂—,

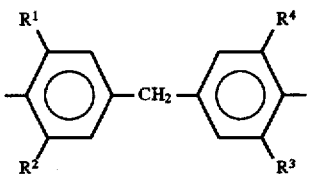
(3)

wherein $R^1$, $R^2$, $R^3$ and $R^4$ are each a $C_{1-4}$ alkyl group or a $C_{1-4}$ alkoxy group, provided that $R^1$, $R^2$, $R^3$, and $R^4$ are not all methyl, Ra is a divalent group having 2–6 benzene rings, X¹ represents NH, NR (wherein R is a $C_{1-4}$ alkyl group or a $C_{1-4}$ alkoxy group) or S, Rb is a $C_{2-20}$ alkylene group, an ether chain represented by the formula: —CH₂CH₂(OCH₂CH₂)ₙ— (wherein n is an integer of 1–8) or a dimethylsiloxane group represented by the formula: —R'—[Si(CH₃)₂O]ₘSi(CH₃)₂—R'— (wherein R' is a $C_{1-10}$ alkyl group or —CH₂OC₆H₄—, and m is an integer of 1–20), X² represents NH, NR (wherein R is a $C_{1-4}$ alkyl group or a $C_{1-4}$ alkoxy group),

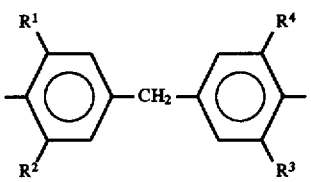
(3)

4. A process for producing a polyimide of claim 1, which comprises reacting a bismaleimide represented by the following formula (6):

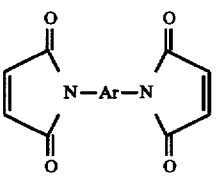
(6)

wherein Ar denotes a divalent group represented by the following formula (2) or (3):

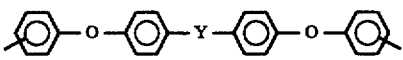
(2)

wherein Y is —O—, —CO—, —S—, —SO₂— or —C(C₃)₂—,

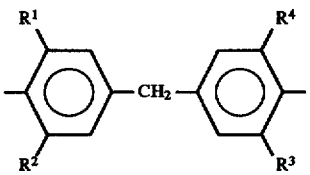
(3)

wherein $R^1$, $R^2$, $R^3$ and $R^4$ are each a $C_{1-4}$ alkyl group or a $C_{1-4}$ alkoxy group, provided that $R^1$, $R^2$, $R^3$, and $R^4$ are not all methyl, with a compound represented by the following formula (7) in a presence of active hydrogen:

 (7)

wherein Ra is a divalent group having 2–6 benzene rings, and X¹ represents NH, NR (wherein R is a $C_{1-4}$ alkyl group or a $C_{1-4}$ alkoxy group) or S.

5. A process for producing a polyimide of claim 2, which comprises reacting a bismaleimide represented by the following formula (6):

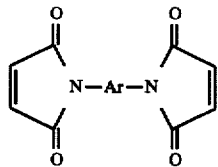   (6)

wherein Ar denotes a divalent group represented by the following formula (2) or (3):

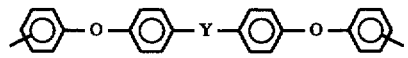   (2)

wherein Y is —O—, —CO—, —S—, —SO$_2$— or —C(C$_3$)$_2$—,

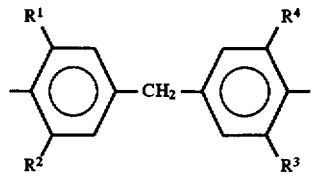   (3)

wherein R$^1$, R$^2$, R$^3$ and R$^4$ are each a C$_{1-4}$ alkyl group or a C$_{1-4}$ alkoxy group, provided that R$^1$, R$^2$, R$^3$ and R$^4$ are not all methyl, with a compound represented by the following formula (8) in a presence of active hydrogen:

HX$^2$—Rb—X$^2$H   (8)

wherein Rb is a C$_{2-20}$ alkylene group, an ether chain represented by the formula: —CH$_2$CH$_2$(OCH$_2$CH$_2$)$_n$— (wherein n is an integer of 1–8) or a dimethylsiloxane group represented by the formula: —R'—[Si(CH$_3$)$_2$O]$_m$Si(CH$_3$)$_2$—R'— (wherein R' is a C$_{1-10}$ alkyl group or —CH$_2$OC$_6$H$_4$—, and m is an integer of 1–20) and X$^2$ represents NH, NR (wherein R is a C$_{1-4}$ alkyl group or a C$_{1-4}$ alkoxy group),

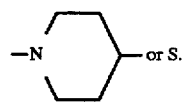 or S.

6. A process for producing a polyimide of claim 3, which comprises reacting a bismaleimide represented by the following formula (6):

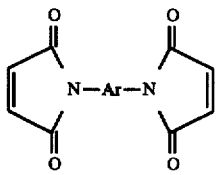   (6)

wherein Ar denotes a divalent group represented by the following formula (2) or (3):

   (2)

wherein Y is —O—, —CO—, —S—, —SO$_2$— or —C(CH$_3$)$_2$—,

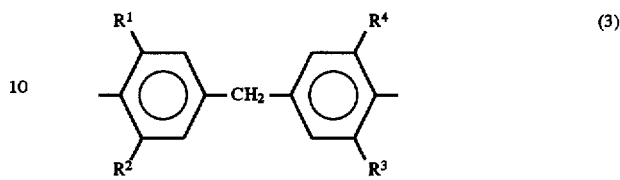   (3)

wherein R$^1$, R$^2$, R$^3$ and R$^4$ are each a C$_{1-4}$ alkyl group or a C$_{1-4}$ alkoxy group, provided that R$^1$, R$^2$, R$^3$, and R$^4$ are not all methyl, with a compound represented by the following formula (7) and a compound represented by the following formula (8) in a presence of active hydrogen:

HX$^1$—Ra—X$^1$H   (7)

wherein Ra is a divalent group having 2–6 benzene rings, and X$^1$ represents NH, NR (wherein R is a C$_{1-4}$ alkyl group or a C$_{1-4}$ alkoxy group) or S, HX$^2$—Rb—X$^2$H   (8)

wherein Rb is a C$_{2-20}$ alkylene group, an ether chain represented by the formula: —CH$_2$CH$_2$(OCH$_2$CH$_2$)$_n$— (wherein n is an integer of 1–8) or a dimethylsiloxane group represented by the formula: —R'—[Si(CH$_3$)$_2$O]$_m$Si(CH$_3$)$_2$—R'— (wherein R' is a C$_{1-10}$ alkyl group or —CH$_2$OC$_6$H$_4$—, and m is an integer of 1–20), and X$^2$ represents NH, NR (wherein R is a C$_{1-4}$ alkyl group or a C$_{1-4}$ alkoxy group),

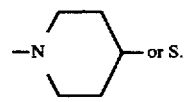 or S.

7. The polyimide of claim 1, wherein X$^1$ is not S.

8. The polyimide of claim 2, wherein X$^2$ is not S.

9. The polyimide of claim 3, wherein X$^1$ and X$^2$ are not S.

10. The process of claim 4, wherein X$^1$ is not S.

11. The process of claim 5, wherein X$^2$ is not S.

12. The process of claim 6, wherein X$^1$ and X$^2$ are not S.

13. The polyimide of claim 2, wherein Rb is not a C$_{2-20}$ alkylene group.

14. The polyimide of claim 3, wherein Rb is not a C$_{2-20}$ alkylene group.

15. The process of claim 5, wherein Rb is not a C$_{2-20}$ alkylene group.

16. The process of claim 6, wherein Rb is not a C$_{2-20}$ alkylene group.

* * * * *

UNITED STATES PATENT AND TRADEMARK OFFICE
CERTIFICATE OF CORRECTION

PATENT NO. : 5,696,235
DATED : December 9, 1997
INVENTOR(S) : Osamu OKA et al

It is certified that error appears in the above-identified patent and that said Letters Patent is hereby corrected as shown below:

On the title page, item [54] should read as follows:

--[54]  POLYMIDE AND PROCESS FOR PROCESS FOR PRODUCING THE SAME--

Column 1, line 1, "AMD" should read --AND--.

Signed and Sealed this

Twenty-fourth Day of February, 1998

Attest:

BRUCE LEHMAN

Attesting Officer

Commissioner of Patents and Trademarks